United States Patent
Akiyama

(10) Patent No.: US 6,384,965 B2
(45) Date of Patent: May 7, 2002

(54) WAVELENGTH DIVISION MULTIPLEXING OPTICAL FIBER AMPLIFIER

(75) Inventor: Koichi Akiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/752,561

(22) Filed: Jan. 3, 2001

(30) Foreign Application Priority Data

Jan. 6, 2000 (JP) .......................................... 12-000907

(51) Int. Cl.[7] .............................................. H04B 10/12
(52) U.S. Cl. ......................... 359/341.4; 359/341; 359/3
(58) Field of Search ........................ 359/341.3, 341.41, 359/341.42, 341.4

(56) References Cited

U.S. PATENT DOCUMENTS

| | | | | |
|---|---|---|---|---|
| 5,268,786 A | * | 12/1993 | Matsushita | 359/341 |
| 5,299,055 A | * | 3/1994 | Yoneyama | 359/341 |
| 5,455,704 A | * | 10/1995 | Mizuochi | 359/179 |
| 5,506,724 A | * | 4/1996 | Shimizu | 359/341 |
| 5,521,753 A | * | 5/1996 | Fake | 359/341 |
| 5,900,968 A | * | 5/1999 | Srivastava | 359/341 |
| 5,900,969 A | * | 5/1999 | Srivastava | 359/341 |
| 5,991,069 A | * | 11/1999 | Jander | 359/337 |
| 6,016,218 A | * | 1/2000 | Jo | 359/341 |
| 6,028,698 A | * | 2/2000 | Ogoshi | 359/341 |
| 6,038,061 A | * | 3/2000 | Sugaya | 359/337 |
| 6,052,394 A | * | 4/2000 | Lee | 372/6 |
| 6,064,515 A | * | 5/2000 | Yang | 359/341 |
| 6,219,177 B1 | * | 4/2001 | Tamura | 359/341 |
| 6,256,140 B1 | * | 7/2001 | Kobayashi | 359/341 |
| 6,271,962 B1 | * | 8/2001 | Choi | 359/337.1 |
| 6,304,371 B1 | * | 10/2001 | Sugiya | 359/341.4 |
| 6,317,255 B1 | * | 11/2001 | Fatehi | 359/341.4 |
| 6,321,002 B1 | * | 11/2001 | Kosaka | 385/24 |

FOREIGN PATENT DOCUMENTS

JP          10-209540          8/1998

* cited by examiner

*Primary Examiner*—Thomas H. Tarcza
*Assistant Examiner*—Andrew R. Sommer
(74) *Attorney, Agent, or Firm*—Young & Thompson

(57) ABSTRACT

The control circuit controls the directional coupling type optical switch, inputs the excited light from the excitation LD light source mainly via the WDM coupler to the EDF, and thereby intensifies forward excitation and controls the drive current of the light source so that the signal light with a desired value is output. On the other hand, when the signal light power with a desired value is not obtained even if the drive current of the light source reaches an upper limit, the control circuit gradually increases the ratio of the excited light to be entered to the EDF via the WDM coupler and at the same time controls the drive current of the light source so that the signal light with the desired value is output.

12 Claims, 4 Drawing Sheets

F I G. 2
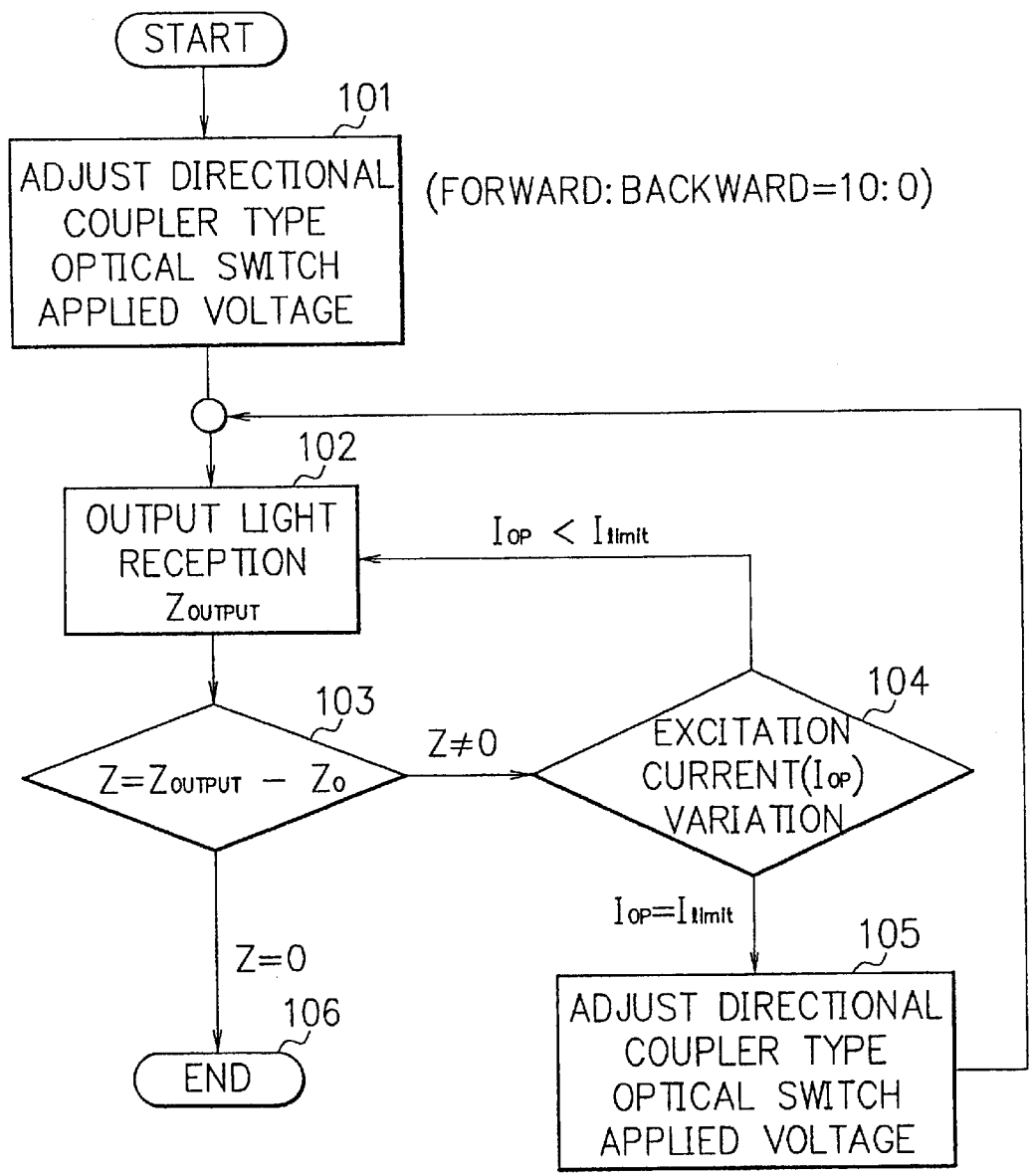

WAVELENGTH DIVISION MULTIPLEXING OPTICAL FIBER AMPLIFIER

BACKGROUND OF THE INVENTION

The present invention relates to a wavelength division multiplexing optical fiber amplifier, and more particularly, to a wavelength division multiplexing optical fiber amplifier that amplifies a wavelength division multiplexing light signal using a fiber doped with rare-earth elements.

PRIOR ART

As a wavelength division multiplexing optical fiber amplifier, EDFA (Erbium Doped Fiber Amplifier) is conventionally known. This EDFA changes output signal optical power according to the number of input signals to keep the input/output level per 1 wavelength constant.

On the other hand, in the field of wavelength division multiplexing optical fiber amplifiers, wavelength division multiplexing optical fiber a amplifiers using a wavelength range of 1580 nm (1570 nm to 1600 nm) instead of the previous 1550 nm range have been developed in recent years. When a high-level (multi-wavelength) signal of approximately −5 dBm (32 waves), etc. is input, the efficiency of this wavelength division multiplexing optical fiber amplifier using the 1580-nm range for forward excitation only or for backward excitation only is as low as 10% and achieving output of +20 dBm would require such high excitation power as 1 W. For this reason, improving the efficiency requires bidirectional excitation.

FIG. 4 shows a block diagram of the above-described conventional example of a wavelength division multiplexing optical fiber amplifier using the 1580-nm range. In the figure, signal light to be amplified is introduced from an optical connector 10 through an optical isolator 11a to a wavelength division multiplexing (WDM) coupler 12a. On the other hand, excited light output from an excitation LD (laser diode) light source 13 is bifurcated with a division ratio of 1:1 by a 1×2 division coupler 14 having a division ratio of 1:1.

The signal light is combined with the excited light from the 1×2 division coupler 14 by the WDM coupler 12a, amplified by an erbium-doped fiber (EDF) 15, combined with the excited light by a WDM coupler 12b and output through an optical isolator 11b to an optical connector 16. In this way, this conventional wavelength division multiplexing optical fiber amplifier provides bidirectional excitation by connecting the 1×2 division coupler 14 to the WDM couplers 12a and 12b provided with on the input side and output side, respectively of the EDF 15 and simultaneously executing forward excitation by which the excited light is input from the input side of the EDF 15 in the same direction as that of the signal light and backward excitation by which the excited light is input from the output side of the EDF 15 in the direction opposite to that of the signal light.

However, a number of wavelength sometimes lacks in the wavelength of the conventional wavelength division multiplexing optical fiber amplifier described above, for example, there becomes inputting of approximately −20 dBm (1 wave). In this case, relatively high efficiency is obtained when bidirectional excitation is applied to obtain output of approximately +5 dBm, and therefore output is obtained with a small amount of excitation power. However, since the EDF 15 is a lengthy fiber, the EDF 15 has a poor inverted population due to backward excitation at the incidence end of the signal light, causing possible deterioration of the noise figure.

On the other hand, another conventional optical fiber amplifier is also known (Japanese Patent Application Laid-Open No. HEI 10-209540) that supplies excited laser light to wave combiners connected on both ends of a rare-earth-doped fiber, directly amplifies a light signal input to the one wave combiner and output from the other wave combiner, and includes one excitation laser that outputs excited laser beam and a light division circuit that divides the laser beam input from this excitation laser and supplies the divided laser beams to the wave combiner on the input side and the wave combiner on the output side.

This conventional optical fiber amplifier adjusts, through the light division circuit, the excitation power output ratio of forward excitation to backward excitation to approximately 1:1, but since the EDF is a lengthy fiber as described above, the problem is that making such an adjustment to 1580-nm range signal light will deteriorate the noise figure.

SUMMARY OF THE INVENTION

The present invention has been implemented taking into account the points described above and it is an object of the present invention to provide a wavelength division multiplexing optical fiber amplifier capable of providing characteristics such as low noise and high output by basically intensifying forward excitation, and in the case where the output is not obtained by gradually increasing the ratio of backward excitation.

In order to attain the above object, the present invention adopts a configuration comprising:

an optical fiber doped with rare-earth elements that amplifies input signal light;

an excitation LD light source that outputs excited light of a predetermined wavelength;

forward excitation means for supplying the excited light from the signal light input side of the optical fiber;

backward excitation means for supplying the excited light from the signal light output side of the optical fiber;

monitoring means for monitoring power of the output signal light output from the optical fiber; and controlling means for repeating a first operation that by maximizing the ratio of forward excitation by the forward excitation means relative to the ratio of backward excitation by the backward excitation means, changes the drive current of the excitation LD light source based on a monitor signal from the monitoring means until power of the output signal light reaches a desired value and when power of the output signal light does not reach the desired value, increases the ratio of backward excitation by a predetermined amount relative to the ratio of forward excitation, and a second operation that changes the drive current of the excitation LD light source based on a monitor signal from the monitoring means until power of the output signal light reaches the desired value, until power of the output signal light reaches the desired value.

Since the present invention maximizes the ratio of forward excitation relative to the ratio of backward excitation and changes the drive current of the excitation LD light source in that state, it is possible to provide light amplification focused on forward excitation when input power is low and also provide light amplification focused on forward excitation even when power of the output signal light does not reach a desired value even if forward excitation is intensified, by gradually increasing the ratio of backward excitation.

In order to attain the above object, the present invention is characterized by configuring the above-described controlling means to include:

a directional coupling type optical switch that variably controls the ratio of the excitation LD light source branched to the forward excitation means and the ratio of the excitation LD light source branched to the backward excitation means according to a signal applied to the electrode; and a control circuit that controls, in an initial state, a signal applied to the electrode of the directional coupling type optical switch so that most of the excited light is supplied to the forward excitation means, compares power of the output signal light detected based on a monitor signal from the monitoring means and the desired value to see whether these two values match or not, changes the drive current of the excitation LD light source until the two values match and adjusts the signal applied to the electrode of the directional coupling type optical switch so that the ratio of the excited light to the backward excitation means increases gradually.

In order to attain the above object, the present invention further provides a wavelength division multiplexing optical fiber amplifier in a two-stage configuration with a first optical fiber amplifier and a second optical fiber amplifier connected via a gain equalizer, the first and second optical fiber amplifiers each comprising:

an optical fiber doped with rare-earth elements that amplifies input signal light;

an excitation LD light source that outputs excited light of a predetermined wavelength;

forward excitation means for supplying the excited light from the signal light input side of the optical fiber;

backward excitation means for supplying the excited light from the signal light output side of the optical fiber;

monitoring means for monitoring power of the output signal light output from the optical fiber; and controlling means for changing the relative proportion between forward excitation by the forward excitation means and backward excitation by the backward excitation means so that power of the output signal light detected based on a monitor signal from the monitoring means matches a desired value and controlling the drive current of the excitation LD light source, characterized in that the controlling means of the first optical fiber amplifier controls so that the ratio of the forward excitation becomes relatively greater than the ratio of the backward excitation and the controlling means of the second optical fiber amplifier controls the relative proportion so that power of the output signal light of the second optical fiber amplifier matches a desired value.

The present invention provides an optical fiber amplifier in two-stage configuration, which can, through the first optical fiber amplifier in the first stage that controls the overall noise figure, perform light amplification focused on forward excitation and, through the second optical fiber amplifier in the second stage, perform optimal bidirectional excitation control according to power of input signal light.

BRIEF DESCRIPTION OF THE DRAWINGS

The objects and features of the present invention will become more apparent from the consideration of the following detailed description taken in conjunction with the accompanying drawings, in which:

FIG. 2 is a flow chart to explain operation of the control circuit of FIG. 1;

DESCRIPTION OF THE PREFERRED EMBODIMENTS

Figure 1:
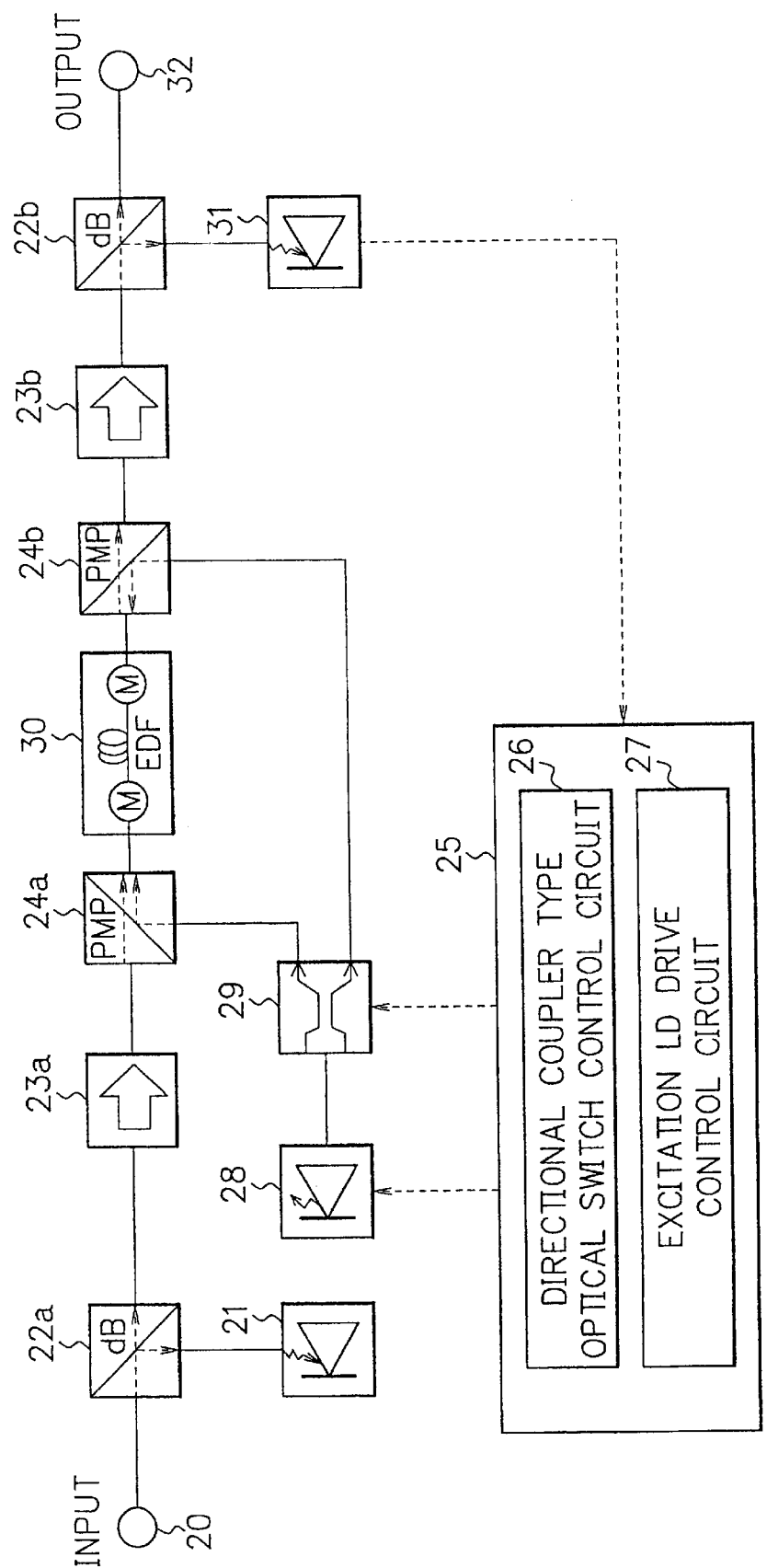
FIG. 1 is a block diagram of a first embodiment of the present invention.

With reference now to the attached drawings, embodiments of the present invention will be explained below. FIG. 1 is a block diagram of a first embodiment of the wavelength division multiplexing optical fiber amplifier of the present invention. In the figure, a signal light to be amplified is inputted from an optical connector 20, led through a 1×2 division coupler 22a, an optical isolator 23a, a wavelength division multiplexing (WDM) coupler 24a, an EDF 30, a wavelength division multiplexing (WDM) coupler 24b, an optical isolator 23b, a 1×2 division coupler 22b and is outputted from an optical connector 32.

The 1×2 division coupler 22a is provided, by means of fusion connecting (fusion splicing), with a photodiode (PD) 21 to monitor input signal light power. The WDM couplers 24a and 24b are provided, by means of fusion connecting, with a directional coupling type optical switch 29 and the directional coupling type optical switch 29 is provided, by means of fusion connecting, an excitation LD light source 28. Furthermore, the 1×2 division coupler 22b is provided, by means of fusion connecting, a PD 31 to monitor amplified signal light power.

This embodiment is further provided with a control circuit 25 to control the directional coupling type optical switch 29 and the excitation LD light source 28 (pumping LD light source 28) so that output signal light is a constant, based on reception data of the PD 31. The control circuit 25 is provided with a directional coupling type optical switch control circuit 26 that controls the directional coupling type optical switch 29 and an excitation LD drive control circuit 27 that controls the excitation LD light source 28.

The excitation LD light source 28 is a high-output semiconductor laser diode to excite the EDF 30. Regarding amplification of a 1580-nm range, the quantum efficiency of a 1550-nm range, which is used for the excitation light source, for excitation of a 1480-nm range is greater than that for excitation of a 980-nm range, and therefore this embodiment uses an InGaAsP/InP laser diode with an oscillation wavelength of approximately 1480 nm band.

The optical isolators 23a and 23b are used to lead light in only one direction and provided to reduce influences of reflection. Moreover, the WDM couplers 22a and 22b are used to combine light beams of different wavelengths and are designed, according to this embodiment, to combine and output the excitation LD light source of a 1480 nm range and the signal light.

The directional coupling type optical switch 29 is a device that can switch between optical paths by externally changing propagation constants of light waveguides. According to this embodiment, the directional coupling type optical switch 29 has a function capable of dividing a light beam output from the excitation LD light source 28 with a desired division ratio because the index of refraction of the directional coupling section changes when a directional coupler is formed with a light guide, an electrode is formed on top of the coupling section and an appropriate voltage is applied to the electrode.

Next, operation of this embodiment will be explained. The signal light introduced through the optical connector 20 is bifurcated (divided) by the 1×2 division coupler 22a, 5% of the divided light is introduced to the PD 21 to monitor input signal light power and the remaining 95% of the divided light is introduced through the optical isolator 23a to the WDM coupler 24a as signal light. On the other hand, the excited light from the excitation LD light source 28 is divided by the directional coupling type optical switch 29 with a division ratio under the control of the control circuit 25, which will be described later and combined with the signal light or divided by the WDM couplers 24a and 24b provided before and after the EDF 30.

The signal light output from the WDF 24a is amplified by the EDF 30 and introduced to the WDF coupler 24b. The amplified signal light output from the WDF coupler 24b is led through the optical isolator 23b, divided by the 1×2 division coupler 22b and 5% of the divided light is introduced to the PD 31 to monitor power of the amplified signal light and the remaining 95% of the divided light is output from the optical connector 32 as the signal light.

Then, control operation by the control circuit 25 of the excitation LD light source 28 and directional coupling type optical switch 29 will be explained with reference to the flow chart of FIG. 2. The directional coupling type optical switch control circuit 26 in the control circuit 25 adjusts a voltage applied to the electrode of the directional coupling type optical switch 29 so that the ratio of forward excitation to backward excitation becomes 10:0 or close to that value (step 101).

Then, the excitation LD drive control circuit 27 in the control circuit 25 converts a detection current with a value corresponding to the amplified signal light power obtained through photoelectric conversion by the PD 31 to a voltage $Z_{OUTPUT}$ (step 102), compares with an externally set reference voltage $Z_0$ (step 103), and when the two voltages do not match, decides whether drive current (excitation current) Iop of the excitation LD light source 28 is smaller than upper limit $I_{limit}$ or not (step 104), and when $I_{op}$ is smaller than upper limit $I_{limit}$, increases the excitation current $I_{op}$ and repeats processing in steps 102 and 103.

The excitation current $I_{op}$ is increased toward the upper limit $I_{limit}$ in this way and when it is decided in step 103 that the detected voltage (output light power) $Z_{OUTPUT}$ matches the reference voltage (output set value) $Z_0$, the processing ends (step 106). This means that the signal light with a desired value is output from the 1×2 division coupler 22b.

Thus, this embodiment allows the signal light with a desired value to be output by intensifying forward excitation first. Since required output power with low input power such as 1-wave input is small, this allows the ratio of forward excitation above to be set to a maximum or close to a maximum, thus suppressing the noise figure to a low level.

However, depending on power of the output signal light, power of the signal light with a desired value may not be obtained even if the drive current of the excitation LD light source 28 reaches the upper limit. Thus, when it is decided in step 104 that excitation current $I_{op}$ has reached the upper limit $I_{limit}$, the excitation LD drive control circuit 27 notifies this information to the directional coupling type optical switch control circuit 26, and then the directional coupling type optical switch control circuit 26 adjusts the voltage applied to the directional coupling type optical switch 29 to change the division ratio so that the ratio of backward excitation increases by a predetermined amount (step 105).

Then, the excitation LD drive control circuit 27 converts the detection current with a value corresponding to the amplified power of the signal light obtained through photoelectric conversion by the PD 31 to voltage $Z_{OUTPUT}$ (step 102), compares with externally set reference voltage Z0 (step 103), and if the two voltages do not match, decides whether drive current (excitation current) $I_{op}$ of the excitation LD light source 28 is smaller than upper limit $I_{limit}$ or not (step 104), and if $I_{op}$ is smaller than upper limit $I_{limit}$, increases the excitation current $I_{op}$ and repeats the processing in steps 102 and 103. Hereinafter, the processing of above steps 102, 103 and 104 is repeated in the same way as shown above until $Z_{OUTPUT}$=$Z_0$ is reached and when $I_{op}$=$I_{limit}$, the excitation LD drive control circuit 27 adjusts the voltage applied to the directional coupling type optical switch 29 again, changes the division ratio so that the ratio of backward excitation increases by a predetermined amount and repeats the processing in steps 102, 103 and 104.

While gradually increasing the ratio of backward excitation, the excitation LD drive control circuit 27 increases excitation current $I_{op}$ toward upper limit $I_{limit}$ and finishes the processing when it is decided in step 103 that detection voltage (output light power) $Z_{OUTPUT}$ matches reference voltage (output set value) $Z_0$ (step 106). This allows the signal light to be output with a desired value from the 1×2 division coupler 22b.

Thus, when the signal light with a desired value cannot be output even if forward excitation is intensified, this embodiment gradually increases the ratio of backward excitation making it possible to obtain power of the output signal light with a desired value in the end. Though with high input power such as 32-wave input, which requires high output power, desired excitation power cannot be obtained through forward excitation alone, this embodiment can minimize the noise figure by gradually increasing the ratio of backward excitation, and moreover obtain power of the output signal light with a desired value.

Figure 3:
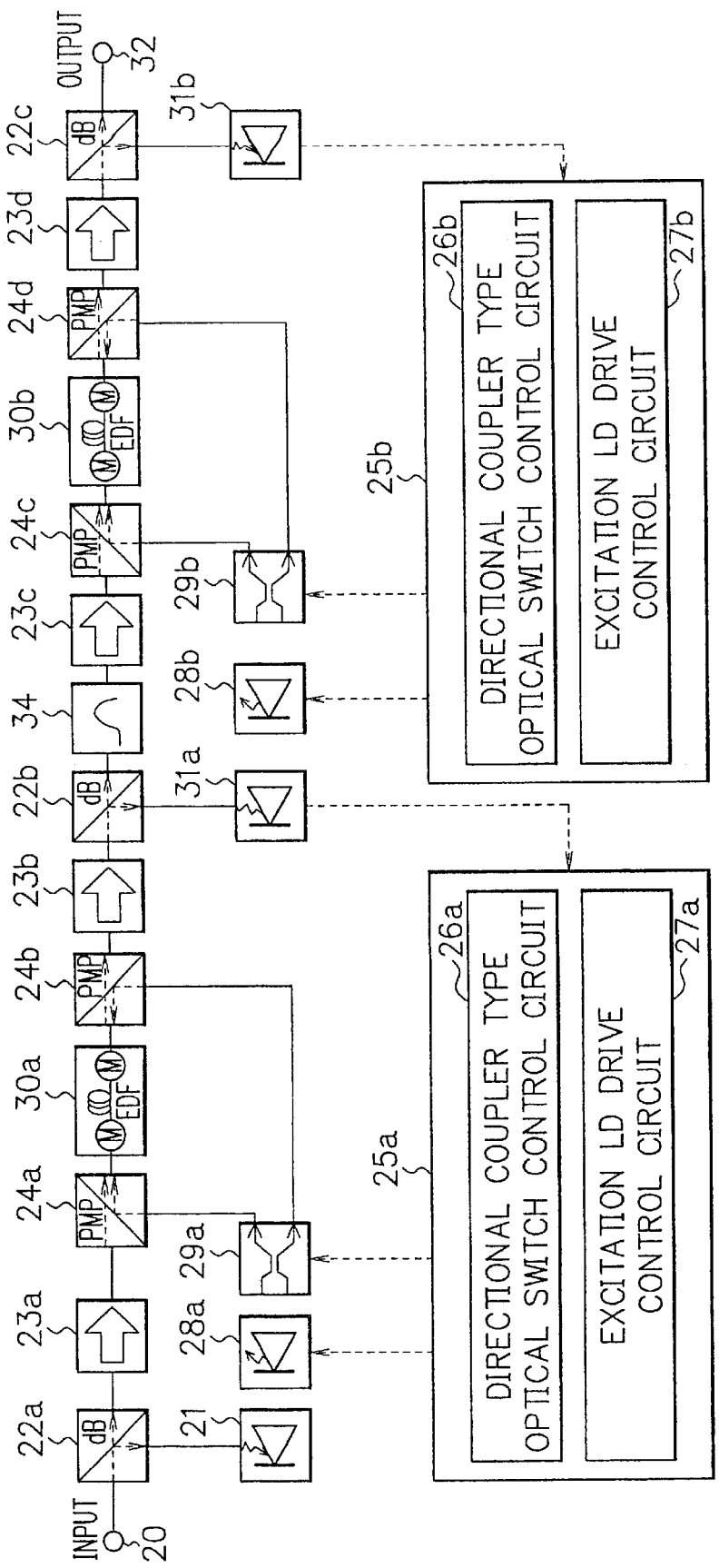
FIG. 3 is a block diagram of a second embodiment of the present invention.
Figure 4:
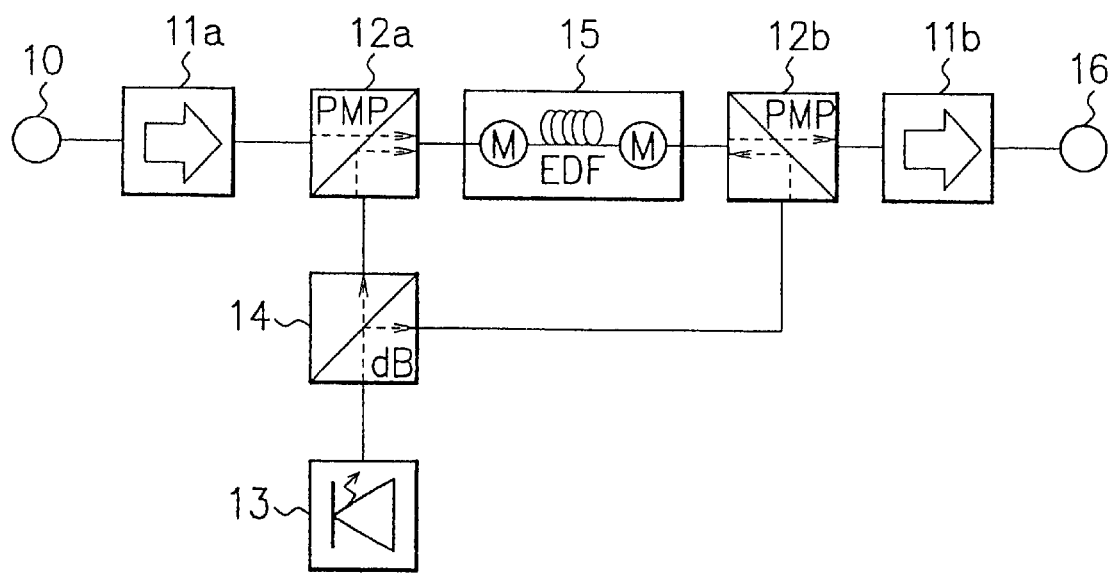
FIG. 4 is a block diagram showing a conventional example.

Next, a second embodiment of the present invention will be explained. FIG. 3 is a block diagram of a second embodiment of the wavelength division multiplexing optical fiber amplifier of the present invention. In the figure, the same components as those in FIG. 1 are assigned the same reference numerals. In FIG. 3, a signal light to be amplified is entered from an optical connector 20 and amplified by a first optical fiber amplifier including a 1×2 division coupler 22a, an optical isolator 23a, a WDM coupler 24a, an EDF 30a, a WDM coupler 24b, an optical isolator 23b, a 1×2 division coupler 22b, led through a gain equalizer 34 and after being amplified by a second optical fiber amplifier including an optical isolator 23c, a WDM coupler 24c, an EDF 30b, a WDM coupler 24d, an optical isolator 23d and a 1×2 division coupler 22c, output from an optical connector 32.

The WDM couplers 24a and 24b are provided, by means of fusion connecting, with a directional coupling type optical switch 29a and the directional coupling type optical switch 29a is provided, by means of fusion connecting, a 1480-nm excitation LD light source 28a. Furthermore, the 1×2 division coupler 22b is provided, by means of fusion connecting, a PD 31a to monitor amplified signal light power. Likewise, the WDM couplers 24c and 24d are provided, by means of fusion connecting, with a directional coupling type optical switch 29b and the directional coupling type optical switch 29b is provided, by means of fusion connecting, a 1480-nm excitation LD light source 28b. Furthermore, the 1×2 division coupler 22c is provided, by means of fusion connecting, a PD 31b to monitor amplified signal light power.

This embodiment is further provided with control circuits 25a and 25b to control the directional coupling type optical switches 29a and 29b and the excitation LD light sources 28a and 28b so that output signal light is constant, based on reception data of the PD 31a and PD 31b. The control circuits 25a and 25b are provided with directional coupling type optical switch control circuits 26a and 26b that control the directional coupling type optical switches 29a and 29b and excitation LD drive control circuits 27a and 27b that control the excitation LD light sources 28a and 28b and perform the same control operation as that of the control circuit 25 of the first embodiment.

This embodiment forms an optical fiber amplifier in a two-stage configuration with a first optical fiber amplifier consisting of an amplification section from the 1×2 division coupler 22a to 22b, PD 21, PD31a, excitation LD light source 28a, directional coupling type optical switch 29a and control circuit 25a, and a second optical fiber amplifier consisting of an amplification section from the optical isolator 23c to 1×2 division coupler 22c, PD 31b, excitation LD light source 28b, directional coupling type optical switch 29b and control circuit 25b, connected via the gain equalizer 34, and both the first and second optical fiber amplifiers are provided with the directional coupling type optical switches 29a and 29b as the excitation systems.

As a result, the first optical fiber amplifier controls the noise figure of the entire amplifier, and therefore suppresses the noise figure of the EDF 30a through the control circuit 25a focused on forward excitation, while the second optical fiber amplifier adjusts the division ratio through the control circuit 25b so that an optimal efficiency is obtained according to input power, thus focused on output power. This is because the two-stage configuration prevents deterioration of the noise figure of the second optical fiber amplifier in the second stage from influencing the noise figure of the entire amplifier a great deal. This suppresses deterioration of the noise figure and allows a 1580-nm range amplified wavelength division multiplexing signal light with desired output power to be obtained from the optical connector 32.

The present invention is not limited to the embodiments above, but is also applicable to optical fibers other than EDF, doped with other rare-earth elements such as praseodymium-doped fiber.

As described above, when input power is low, the present invention performs light amplification focused on forward excitation, thus making it possible to suppress the noise figure to a low level. On the other hand, when power of the output signal light does not reach a desired value even if forward excitation is intensified, the present invention performs light amplification focused on forward excitation by gradually increasing the ratio of backward excitation, thus making it possible to obtain desired high-output light power and secure required efficiency while minimizing deterioration of the noise figure when input power is high.

Furthermore, the present invention provides an optical fiber amplifier in a two-stage configuration with the first optical fiber amplifier that controls the overall noise figure performing light amplification focused on forward excitation and the second optical fiber amplifier performing optimal bidirectional control according to power of the input signal light, making it possible to efficiently obtain desired output light power with deterioration of the noise figure suppressed to a minimum.

What is claimed is:

1. A wavelength division multiplexing optical fiber amplifier comprising:
    an optical fiber doped with rare-earth elements that amplifies input signal light;
    an excitation LD light source that outputs excited light of a predetermined wavelength;
    forward excitation means for supplying said excited light from the signal light input side of said optical fiber;
    backward excitation means for supplying said excited light from the signal light output side of said optical fiber;
    monitoring means for monitoring power of the output signal light output from said optical fiber; and
    controlling means for repeating a first operation that by maximizing the ratio of forward excitation by said forward excitation means relative to the ratio of backward excitation by said backward excitation means, changes the drive current of said excitation LD light source based on a monitor signal from said monitoring means until power of said output signal light reaches a desired value and when power of said output signal light does not reach said desired value, increases said ratio of backward excitation by a predetermined amount relative to said ratio of forward excitation, and a second operation that changes the drive current of said excitation LD light source based on a monitor signal from said monitoring means until power of said output signal light reaches said desired value, until power of said output signal light reaches the desired value.

2. A wavelength division multiplexing optical fiber amplifier comprising:
    an optical fiber doped with rare-earth elements that amplifies input signal light;
    an excitation LD light source that outputs excited light of a predetermined wavelength;
    forward excitation means for supplying said excited light from the signal light input side of said optical fiber;
    backward excitation means for supplying said excited light from the signal light output side of said optical fiber;
    monitoring means for monitoring power of the output signal light output from said optical fiber; and
    controlling means for repeating a first operation that by maximizing the ratio of forward excitation by said forward excitation means relative to the ratio of backward excitation by said backward excitation means, changes the drive current of said excitation LD light source based on a monitor signal from said monitoring means until power of said output signal light reaches a desired value and when power of said output signal light does not reach said desired value, increases said ratio of backward excitation by a predetermined amount relative to said ratio of forward excitation, and a second operation that changes the drive current of said excitation LD light source based on a monitor signal from said monitoring means until power of said output signal light reaches said desired value, until power of said output signal light reaches the desired value said controlling means comprising:
    a directional coupling type optical switch that variably controls the ratio of said excitation LD light source branched to said forward excitation means and the ratio of said excitation LD light source branched to said backward excitation means according to a signal applied to the electrode; and
    a control circuit that controls, in an initial state, a signal applied to the electrode of said directional coupling type optical switch so that most of said excited light is supplied to said forward excitation means, compares power of said output signal light detected based on a monitor signal from said monitoring means and said desired value to see whether these two values match or not, changes the drive current of said excitation LD light source until the two values match and adjusts the signal applied to the electrode of said directional coupling type optical switch so that the ratio of said excited light supplied to said backward excitation means increases gradually.

3. A wavelength division multiplexing optical fiber amplifier comprising:

an optical fiber doped with rare-earth elements that amplifies input signal light;

an excitation LD light source that outputs excited light of a predetermined wavelength;

forward excitation means for supplying said excited light from the signal light input side of said optical fiber;

backward excitation means for supplying said excited light from the signal light output side of said optical fiber;

monitoring means for monitoring power of the output signal light output from said optical fiber; and controlling means for repeating a first operation that by maximizing the ratio of forward excitation by said forward excitation means relative to the ratio of backward excitation by said backward excitation means, changes the drive current of said excitation LD light source based on a monitor signal from said monitoring means until power of said output signal light reaches a desired value and when power of said output signal light does not reach said desired value, increases said ratio of backward excitation by a predetermined amount relative to said ratio of forward excitation, and a second operation that changes the drive current of said excitation LD light source based on a monitor signal from said monitoring means until power of said output signal light reaches said desired value, until power of said output signal light reaches the desired value, said signal light input to said optical fiber is of a 1580-nm range and said excited light has a wavelength of approximately 1480 nm.

4. A wavelength division multiplexing optical fiber amplifier comprising:

an optical fiber doped with rare-earth elements that amplifies input signal light;

an excitation LD light source that outputs excited light of a predetermined wavelength;

forward excitation means for supplying said excited light from the signal light input side of said optical fiber;

backward excitation means for supplying said excited light from the signal light output side of said optical fiber;

monitoring means for monitoring power of the output signal light output from said optical fiber; and controlling means for repeating a first operation that by maximizing the ratio of forward excitation by said forward excitation means relative to the ratio of backward excitation by said backward excitation means, changes the drive current of said excitation LD light source based on a monitor signal from said monitoring means until power of said output signal light reaches a desired value and when power of said output signal light does not reach said desired value, increases said ratio of backward excitation by a predetermined amount relative to said ratio of forward excitation, and a second operation that changes the drive current of said excitation LD light source based on a monitor signal from said monitoring means until power of said output signal light reaches said desired value, until power of said output signal light reaches the desired value said controlling means comprising:

a directional coupling type optical switch that variably controls the ratio of said excitation LD light source branched to said forward excitation means and the ratio of said excitation LD light source branched to said backward excitation means according to a signal applied to the electrode; and a control circuit that controls, in an initial state, a signal applied to the electrode of said directional coupling type optical switch so that most of said excited light is supplied to said forward excitation means, compares power of said output signal light detected based on a monitor signal from said monitoring means and said desired value to see whether these two values match or not, changes the drive current of said excitation LD light source until the two values match and adjusts the signal applied to the electrode of said directional coupling type optical switch so that the ratio of said excited light supplied to said backward excitation means increases gradually; and said signal light input to said optical fiber is of a 1580-nm range and said excited light has a wavelength of approximately 1480 nm.

5. A wavelength division multiplexing optical fiber amplifier in a two-stage configuration with a first optical fiber amplifier and a second optical fiber amplifier connected via a gain equalizer, said first and second optical fiber amplifiers each comprising:

an optical fiber doped with rare-earth elements that amplifies input signal light;

an excitation LD light source that outputs excited light of a predetermined wavelength;

forward excitation means for supplying said excited light from the signal light input side of said optical fiber;

backward excitation means for supplying said excited light from the signal light output side of said optical fiber;

monitoring means for monitoring power of the output signal light output from said optical fiber; and controlling means for changing the relative proportion between forward excitation by said forward excitation means and backward excitation by said backward excitation means so that power of said output signal light detected based on a monitor signal from said monitoring means matches a desired value and controlling the drive current of said excitation LD light source, wherein said controlling means of said first optical fiber amplifier controls so that the ratio of said forward excitation becomes relatively greater than the ratio of said backward excitation and said controlling means of said second optical fiber amplifier controls said relative proportion so that power of said output signal light of said second optical fiber amplifier matches a desired value.

6. A wavelength division multiplexing optical fiber amplifier in a two-stage configuration with a first optical fiber amplifier and a second optical fiber amplifier connected via a gain equalizer, said first and second optical fiber amplifiers each comprising:

an optical fiber doped with rare-earth elements that amplifies input signal light;

an excitation LD light source that outputs excited light of a predetermined wavelength;

forward excitation means for supplying said excited light from the signal light input side of said optical fiber;

backward excitation means for supplying said excited light from the signal light output side of said optical fiber;

monitoring means for monitoring power of the output signal light output from said optical fiber; and controlling means for changing the relative proportion between forward excitation by said forward excitation means and backward excitation by said backward excitation means so that power of said output signal light detected based on a monitor signal from said monitoring means matches a desired value and controlling the drive current of said excitation LD light source, wherein said controlling means of said first optical fiber amplifier controls so that the ratio of said forward excitation becomes relatively greater than the ratio of said backward excitation and said controlling means of said second optical fiber amplifier controls said relative proportion so that power of said output signal light of said second optical fiber amplifier matches a desired value, said signal light input to the optical fibers of said first and second optical fiber amplifiers is of a 1580-nm range and said excited light has a wavelength of approximately 1480 nm.

7. The wavelength division multiplexing optical fiber amplifier according to claim 1, wherein said optical fiber is an erbium-doped fiber.

8. The wavelength division multiplexing optical fiber amplifier according to claim 2, wherein said optical fiber is an erbium-doped fiber.

9. The wavelength division multiplexing optical fiber amplifier according to claim 3, wherein said optical fiber is an erbium-doped fiber.

10. The wavelength division multiplexing optical fiber amplifier according to claim 4, wherein said optical fiber is an erbium-doped fiber.

11. The wavelength division multiplexing optical fiber amplifier according to claim 5, wherein said optical fiber is an erbium-doped fiber.

12. The wavelength division multiplexing optical fiber amplifier according to claim 6, wherein said optical fiber is an erbium-doped fiber.

* * * * *